Sept. 2, 1930.  W. MESSINGER  1,774,655
CAR JOURNAL ROLLER BEARING BOX
Filed May 31, 1927  2 Sheets-Sheet 1

WITNESS:

INVENTOR
William Messinger
BY Augustus B. Stoughton
ATTORNEY.

Sept. 2, 1930.  W. MESSINGER  1,774,655

CAR JOURNAL ROLLER BEARING BOX

Filed May 31, 1927  2 Sheets-Sheet 2

WITNESS:
Robt R Kitchel.

INVENTOR
William Messinger
BY
Augustus B Broughton
ATTORNEY.

Patented Sept. 2, 1930

1,774,655

UNITED STATES PATENT OFFICE

WILLIAM MESSINGER, OF PHILADELPHIA, PENNSYLVANIA, ASSIGNOR TO MESSINGER BEARINGS, INC., OF PHILADELPHIA, PENNSYLVANIA, A CORPORATION OF PENNSYLVANIA

CAR-JOURNAL ROLLER-BEARING BOX

Application filed May 31, 1927. Serial No. 195,322.

Objects of the present invention are to stiffen and conserve the truly cylindrical shape of the bore of the box and to prevent lubricant leakage; to provide for facility in assembling and dismantling the parts; to provide an efficient seal between the journal and bore of the rear cover; to provide for ready removal of the box and roller bearing parts; to prevent peining out of the axle and yet provide for removal of the inner race of the journal bearing; to provide micrometer adjustment for the lock-nut; to confine impacts to the side frame of the truck which is on the same side of the car as the wheel which receives the thrust thus opposing endwise sliding of the journal box and limiting side swaying of the car body and thus causing the car to take curves gradually without impact, reducing wear of wheel flanges and prolonging the life of the wheels; to provide for radial displacement of the elements of the thrust bearing without impairing the ability of the thrust rollers to function properly; to prefix the clearance between the outside or end plates of the thrust bearing; and generally, to provide a car journal roller bearing box adapted to meet the conditions of service, including manufacture, assembly, and performance.

The invention will be claimed at the end hereof and, generally stated, it comprises a journal having a shoulder and a nut, an inner element mounted on the journal and clamped between the shoulder and nut and comprising the inner race of a roller journal bearing having a prolongation or neck and the center plate of a double thrust roller bearing, a box having a cylindrical bore and provided with end covers, and an outer fixed element arranged in the bore of the box and clamped between the covers and comprising the outer race of a roller journal bearing and a structure consisting of the outer plates of a double thrust roller bearing and a spacer interposed between and connected with the outer plates.

The invention also comprises the improvements to be presently described and finally set forth in the claims.

In the following description reference will be made to the accompanying drawings forming part hereof and in which Figure 1 is a view principally in central section of a car journal roller bearing box embodying features of the invention.

Figure 1:
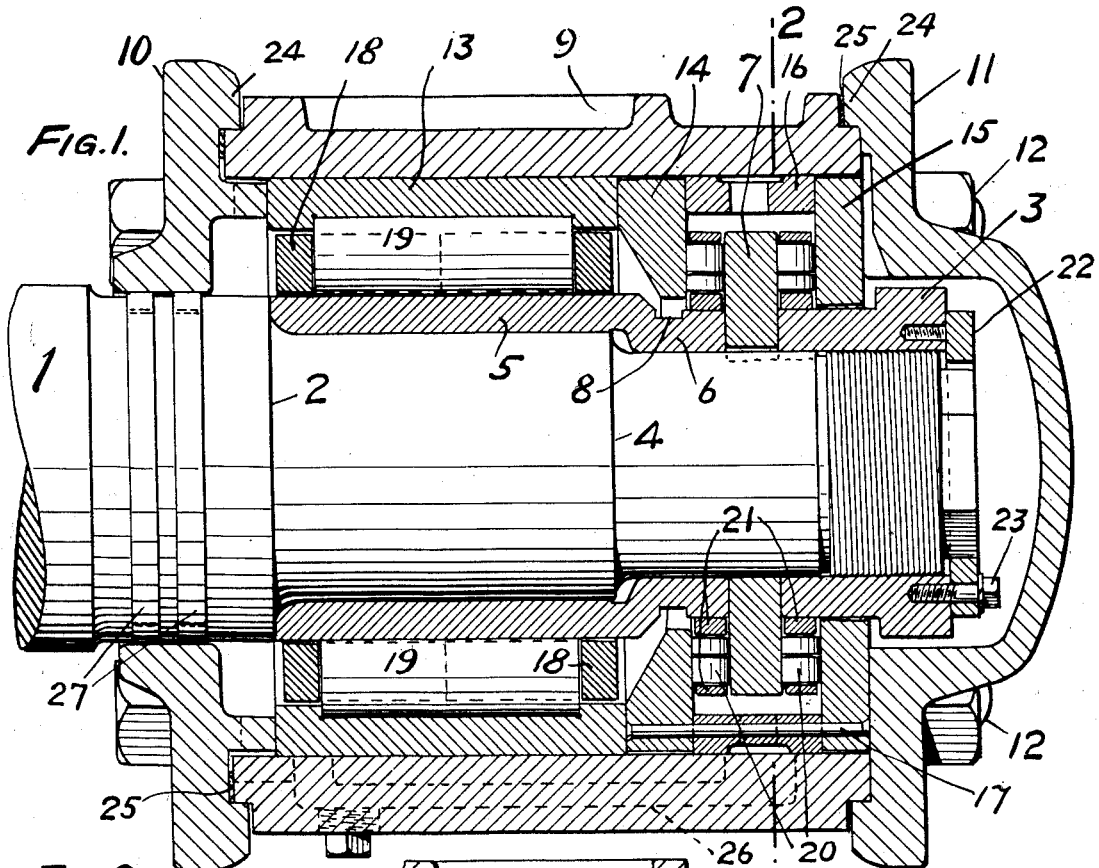
Figure 2:
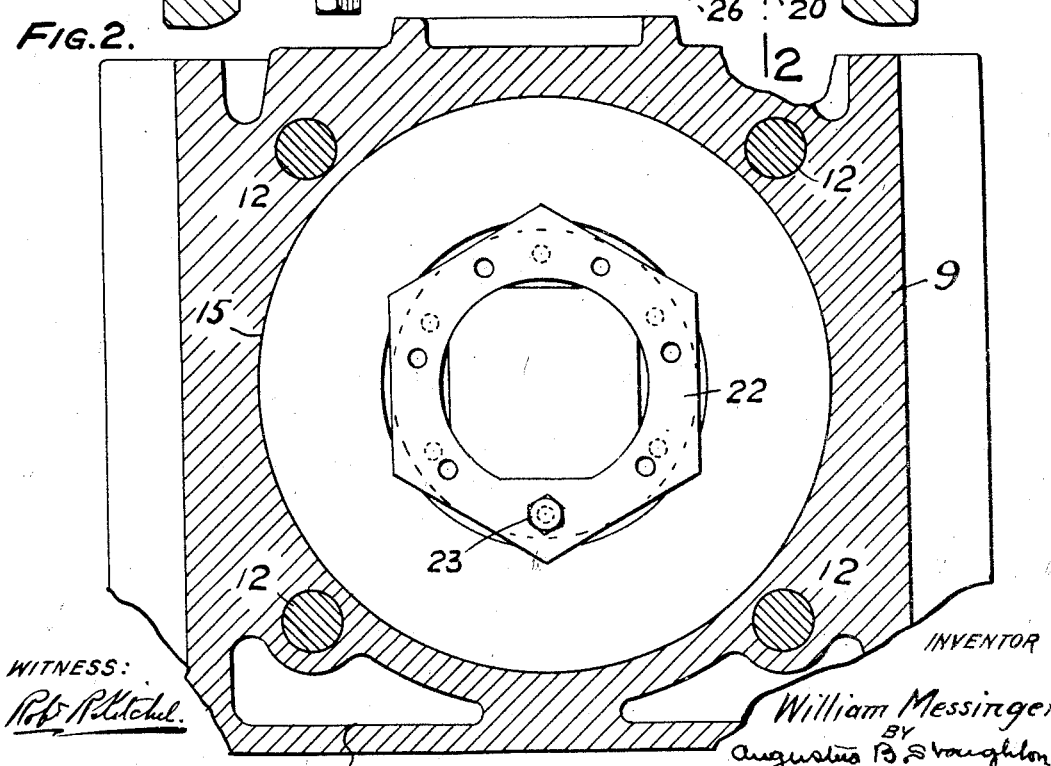
Fig. 2 is a sectional view taken on the line 2—2 of Fig. 1 exposing the end of the journal.

Referring to the drawings, more particularly Figs. 1 and 2, 1 is a journal having a shoulder 2 and a sleeve nut 3. The journal is shown as of reduced diameter at 4. There is an inner element mounted on the journal and clamped between the shoulder 2 and the end of the sleeve of the nut 3. This element comprises the inner race 5 of a roller journal bearing having a prolongation or neck 6, and the center plate 7 of a double thrust roller bearing. The inner race 5 is shrunk onto the journal and its neck 6 is provided with a groove 8 by means of which it can be pulled off, for example when the journal is worn. The center plate 7 is mounted on the journal with a slip fit and is keyed to the journal and it abuts upon the outer end of the sleeve 6. The box 9 is provided with a cylindrical bore and is fitted with end covers 10 and 11, and there are bolts 12, of which four are shown connecting the covers. The assembly is therefore easy as is also the operation of dismantling the parts. There is an outer fixed element arranged in the bore of the box and clamped between the covers 10 and 11, and it comprises the outer race 13 of the roller journal bearing and a structure consisting of the outer plates 14 and 15 of a double thrust roller bearing, and a spacer 16 interposed between the plates and connected therewith by rivets 17. The outer race 13 is provided with inturned end flanges so that the cage 18 with the rollers 19 is positioned against movement in axial direction. The rollers 20 of the double thrust bearing are radially arranged in their retainers or carriers 21. The plates of the double thrust roller bearing present flat faces to the rollers so that the latter can be dressed, and there is an allowance for slight eccentricity of the parts of the bearing which always occurs because there must be some clearance provided for the rollers 19. It may be remarked that the clearance for the outer plates of the double thrust bearing is fixed in the shop, or pre-fixed by the provision of the spacer 16, so that it makes no difference whether the bolts 12 are unduly tightened or not. The center plate 7 of the double thrust bearing is accurately located by the neck 6 of the inner race 5 so that when the nut 3 is properly adjusted the position of the center plate 7 is accurately determined.

Figure 3:
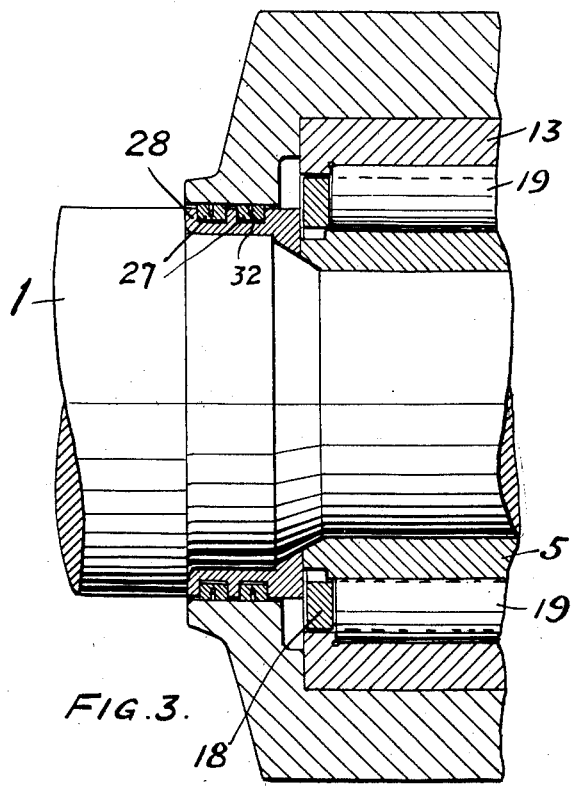
Fig. 3 is a sectional view illustrating a modification of the invention and also details of construction.
Figure 5:
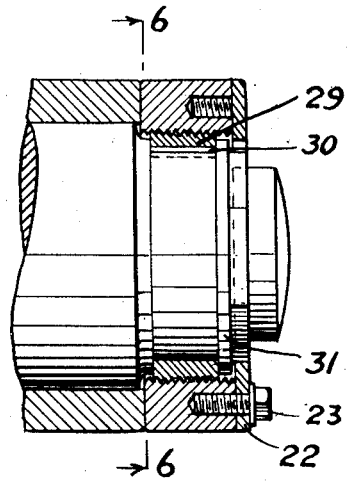
Fig. 5 is a sectional end view of the outer ring of the structure shown in Fig. 3.
Figure 4:
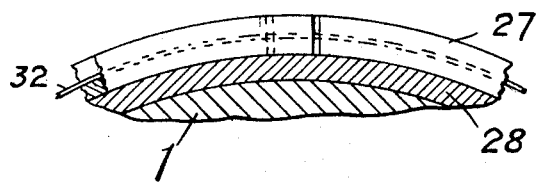
Fig. 4 is a fragmentary sectional view illustrating the piston ring packing.
Figure 6:
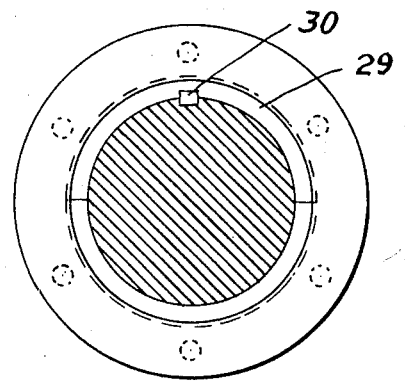
Fig. 6 is a sectional view taken on the line 6—6 of Fig. 5.

22 is a D-type washer with a differential arrangement of holes and it is mounted on the squared end of the journal and it is provided with a screw 23, so that the nut 3 can be readily locked into any position in which it is adjusted and which is appropriate for securing the parts in the manner described. The covers are provided with flanges or beads 24 which operate to stiffen and conserve the cylindrical shape of the bore in the box. 25 are packings as of cork and they serve to provide a tight joint between the covers and the ends of the box. 26 are channels for oil or lubricant and they establish communication between the lubricant retaining pockets at the front and rear ends of the box permitting free circulation. 27 are piston ring seals between the journal and bore of the rear cover 10. As shown in Fig. 1 the journal or axle 1 is grooved for the reception of the piston rings or split metallic packing rings and the thread for the nut 3 is cut on the journal. However, as shown in Figs. 3 and 5, a grooved collar 28 is mounted on the journal and the split metal rings 27 are mounted in the grooves of the collar. Referring to Fig. 5, a threaded thimble 29 is placed on the nut end of the journal, keyed by the key 30 and held to place by the flange 31. As shown the thimble is made in two parts and they are assembled on the journal before the thread is cut, being suitably held together during that operation. The wires 32 are convenient means for holding the split rings 27 in their grooves during assembly of the parts.

Referring to Fig. 1, it is evident that when the front cover 11 is taken off the nut 3 can be removed and the parts of the bearing that have been referred to as the fixed element along with the center plate 7 and the parts carried thereby can be withdrawn as a unit. The parts may be readily assembled by reversing the operation last described.

It will be obvious to those skilled in the art to which the invention relates that modifications may be made in details of construction and arrangement and in matters of mere form without departing from the spirit of the invention which is not limited to such matters or otherwise than the prior art and the appended claims may require.

I claim:

1. A journal and thrust roller bearing car box including a journal having a shoulder and a nut, an inner element mounted on the journal and clamped between the shoulder and nut and comprising the inner race of a roller journal bearing having an integral prolongation or neck and a non-rotatable center plate of a double thrust roller bearing, a box having a cylindrical bore and provided with end covers and with bolts extending between and connecting the covers, and an outer fixed element arranged in the bore of the box and clamped between the covers and comprising the outer race of a roller journal bearing and a structure removable as a unit and consisting of the outer plates of a double thrust roller bearing and a spacer interposed between and connected with said outer plates.

2. A journal and thrust roller bearing car box as specified in claim 1 in which the nut is provided with a D-type washer having holes in differential arrangement and having a screw.

3. A journal and thrust roller bearing car box as specified in claim 1 and which is provided with end flanges on the outer journal roller race and which is equipped with a roller cage arranged out of contact with the inner and outer roller races.

4. A journal and thrust roller bearing car box as specified in claim 1 and in which the journal has a portion of reduced diameter and in which the neck on the inner journal roller race conforms to the portion of reduced diameter.

WILLIAM MESSINGER.